(12) United States Patent
Truong et al.

(10) Patent No.: US 9,838,606 B2
(45) Date of Patent: Dec. 5, 2017

(54) TRANSPARENT SCREEN COVER

(71) Applicants: Samkol Truong, Foothill Ranch, CA (US); Robert P. Helstern, Irvine, CA (US)

(72) Inventors: Samkol Truong, Foothill Ranch, CA (US); Robert P. Helstern, Irvine, CA (US)

(73) Assignee: Optic Clear Solutions, LLC, Anaheim, CA (US)

( * ) Notice: Subject to any disclaimer, the term of this patent is extended or adjusted under 35 U.S.C. 154(b) by 228 days.

(21) Appl. No.: 14/934,238

(22) Filed: Nov. 6, 2015

(65) Prior Publication Data

US 2017/0134660 A1    May 11, 2017

(51) Int. Cl.

| | | |
|---|---|---|
| *G02F 1/1335* | (2006.01) | |
| *H04N 5/232* | (2006.01) | |
| *B32B 3/26* | (2006.01) | |
| *B32B 27/30* | (2006.01) | |
| *B32B 7/12* | (2006.01) | |
| *H04N 5/225* | (2006.01) | |
| *H04N 5/64* | (2006.01) | |
| *G02F 1/1333* | (2006.01) | |

(52) U.S. Cl.
CPC ......... *H04N 5/23293* (2013.01); *B32B 3/263* (2013.01); *B32B 7/12* (2013.01); *B32B 27/308* (2013.01); *G02F 1/133502* (2013.01); *H04N 5/2251* (2013.01); *H04N 5/64* (2013.01); *B32B 2307/408* (2013.01); *B32B 2307/412* (2013.01); *B32B 2457/20* (2013.01); *B32B 2559/00* (2013.01); *G02F 2001/133331* (2013.01); *G02F 2001/133562* (2013.01)

(58) Field of Classification Search
CPC .... H04N 5/23293; H04N 5/2251; H04N 5/64; B32B 3/263; B32B 7/12; B32B 27/308; B32B 2307/408; B32B 2457/20; B32B 2559/00; G02F 1/133502; G02F 2001/133331; G02F 2001/133562

See application file for complete search history.

(56) References Cited

U.S. PATENT DOCUMENTS

| | | | |
|---|---|---|---|
| 5,929,834 A | 7/1999 | Inoue et al. | |
| 6,050,833 A * | 4/2000 | Danzyger | G06F 1/1609 |
| | | | 248/201 |
| 6,674,496 B2 | 1/2004 | Wei | |
| 6,927,834 B2 * | 8/2005 | Deary | G02F 1/1333 |
| | | | 349/158 |
| 7,206,464 B2 * | 4/2007 | Haim | G02B 1/11 |
| | | | 382/325 |
| 7,619,826 B2 * | 11/2009 | Watanabe | G02B 27/0101 |
| | | | 345/7 |
| 8,816,578 B1 * | 8/2014 | Peng | G02F 1/133502 |
| | | | 313/478 |
| 2001/0017661 A1 | 8/2001 | Shono | |
| 2008/0142819 A1 | 6/2008 | Liu et al. | |

* cited by examiner

*Primary Examiner* — Nathanael R Briggs
(74) *Attorney, Agent, or Firm* — Paul D. Chancellor; Ocean Law (57) ABSTRACT

A transparent cover or shield of variable thickness prevents glare using particular dimensions in particular applications.

10 Claims, 6 Drawing Sheets

TRANSPARENT SCREEN COVER

INCORPORATION BY REFERENCE

This application incorporates by reference, in their entireties and for all purposes, the disclosure of the following patents and patent application publications relating to liquid crystal displays and digital cameras: U.S. Pat. No. 5,929,834 filed Apr. 18, 1996 and U.S. Pat. No. 6,674,496 filed Jul. 17, 2002; U.S. Pat. Pub. Nos. 2001/0017661 filed Feb. 23, 2001 and 2008/0142819 filed Dec. 7, 2007.

BACKGROUND OF THE INVENTION

Field of the Invention

The present invention relates to optical devices. In particular, a transparent screen cover provides an improved viewing experience in the presence of sources of undesirable screen glare.

Discussion of the Related Art

Modern display screens are found in devices including cellular telephones, digital cameras, and flat screen televisions to mention a few. Frequently referred to as "flat screens," these devices may provide only a poor viewing experience when viewed in the presence of an external source of glare such as sunlight, artificial light, and reflected light.

It is known that Liquid Crystal Displays (LCDs) are common place in numerous portable consumer electronics devices that feature small fixed non-adjustable viewable displays such as digital cameras, hand held GPS devices, laptops and cellular telephones to mention a few.

These fixed viewable LCDs emit pictures or data from screens that cannot be adjusted to improve the angle of view. Such LCD screens are also sources of undesirable reflective glare. Reflective glare is undesirable for reasons including glare intensities that mask, distort, and/or render indecipherable images presented on the LCD screen during normal viewing conditions.

Portable consumer electronics with fixed viewable LCDs are packaged by LCD manufacturers to include a clear glass or a clear plastic screen cover that serves to protect the LCD from damage such as damage due to environmental conditions. Typical designs attempt to preserve the viewing characteristics of the LCD's cover against degradation to enable reproduction of sharp images and true color rendering of the native LCD screen. However, when these clear glass or plastic LCD screen covers are exposed to directional ambient light, the LCD clear screen cover generally fails to adequately manage directional glare.

Glare or intense light reflected from a surface is annoying and discomforting to the human eye and causes the observer to have a visual hardship after prolonged viewing. Manufacturers of portable electronic equipment have attempted to manage directional specular glare by
  1) increasing the brightness of the LCD back light;
  2) providing a glare management finish to the LCD clear cover; and,
  3) providing a neutral density pigment to improve viewing contrast.

Increasing the LCD back light generally places more electrical demand on these portable devices as it directly affects battery life. To compensate, manufacturers reduce other electrical features of the portable device or provide the device with a larger capacity battery, which in turn makes the device heavier and perhaps larger.

Increasing the LCD back light generally places more electrical demand on these portable devices as it directly affects battery life. To compensate, manufacturers reduce other electrical features of the portable device or provide the device with a larger capacity battery, which again increases device size and weight. These solutions lean against industry/consumer trends to make products smaller and lighter with longer electrical operating life between device battery recharges or replacement.

Some LCD manufacturers provide a glare management system with the LCD screen cover. Typical designs use LCD screen covers with a matt finish on the outermost surface of the cover.

Matt surface glare management operates by breaking up the incident light ray and causing it to scatter in many directions which reduces/dilutes the intensity of observed glare. Grain size and depth determine to a large extent the light scattering properties of the matt surface and must therefore be appropriately chosen to address anticipated sources of glare.

While matt finishing of the clear glass or clear plastic cover may allow for various grain size/depth options, competing interests severely limit these choices. In particular, the clear LCD screen cover must maintain image sharpness and true color rendering of the native LCD projection and/or screen.

Matt finishing for glare control management is directly related to the size of the grain needed which depends largely on grain size and resolution of the native LCD screen. This relationship tends to limit the grain size to a fine grain finish of the original specular (glossy) surface of the clear cover. Because the matt surface is considered reasonably matched to the LCD size and resolution, the glare management capability of matt finish solutions is greatly reduced. Hence, undesirable glare persists albeit somewhat reduced in intensity.

LCD manufacturers have also included a neutral density pigment or dye into the composition of the LCD screen cover in an attempt to reduce the magnitude of second surface reflection. The effect on the second surface reflection occurs when light rays are attenuated while passing through the LCD screen cover and attenuated again the light rays leave the cover and travel to the human eye. The effect on the observer is that the intensity of directed rays of light visualized as second surface reflections is reduced.

However, the method of adding a neutral density pigment or dye to the LCD cover does nothing to remedy the glare on the outermost viewing surface of the LCD screen cover unless the front surface has been treated with a non-glare or matt finish.

Once again, the second viewing objective of the LCD screen cover is to provide true color rendering of the native LCD screen. Neutral density pigments or dyes within the LCD screen cover can darken the color aspect of the native LCD screen. Transmittance grades of these can vary between 50 and 70 percent. Since the neutral density LCD screen cover attenuates light passing through it, LCD light passing through the screen is attenuated which forces manufacturers to increase LCD back light which again adversely affects battery life, product size and weight.

Another glare management is use of "AR" coatings. AR (anti-reflective) coatings manage glare by effecting a limited reflection of the outermost viewing surface of the incident light rays such that only 1% or 2% of the total incident light is reflected back to an observer. These coatings are very effective in reducing glare when the incident light ray falls within the effective incident angle management range, typically about 45 degrees incident.

While AR coatings often provide precise redirection of the incident reflected light, they are typically relatively expensive additions to consumer electronics products. Yet another limitation on use of AR coatings is the ease with which they may be scratched, worn, diminished, or otherwise degraded by any of handling, accidents, and environmental conditions. These limitations are especially evident with coated plastic optical parts reliant on coating laminations to accomplish the AR effect. For example, environmental exposure may cause the laminate to decouple from the plastic which spoils the image quality of the LCD. To the extent that improved AR coatings provide enhanced environmental resistance, they typically come at considerably higher cost than standard AR coatings.

AR coatings are generally difficult to clean and maintain an AR treated surface is more easily smudged than a comparable surface free of AR coating. As such, AR coated surfaces generally require handling and care similar to that of glass optics such as the glass optics of DLSR cameras.

The above solutions for managing LCD screen glare appear to the inventors as inconsistent with consumer and industry trends requiring improved optical performance from smaller, lighter products with longer battery powered operating periods.

Although the designers of optics in portable devices and especially in digital cameras are slow to embrace new technologies, one or more embodiments of the present invention provide an improved solution to a problem long considered to be adequately managed, glare from electronic display screens.

SUMMARY OF THE INVENTION

Embodiments of the present invention provide a transparent cover or shield means for reducing glare as from an electronic display screen.

Some embodiments of the present invention relate to fixed (non-adjustable) small LCD screen formats suited for portable consumer electronic devices requiring full color display capability. And, some embodiments are applicable to larger LCD screen formats such as television size screen formats. Selected embodiments of the present invention may eliminate substantially all of the reflective glare affecting a fixed, non-adjustable LCD screen without display image degradation and without use of anti-reflection ("AR") coatings and/or finishes. And, some AR coating free embodiments of the present invention provide for ease of cleaning and withstand ordinary use and handling while providing the LCD screen observer with images that are not perceptibly degraded by glare management.

In an embodiment, an improved LCD screen cover eliminates up to 100 percent of directional glare from the eye of an observer. This feature occurs when the present invention is disposed directly in front of a fixed, non-adjustable LCD screen without image degradation of the native LCD screen. The LCD screen cover includes a primary lens having a pair of light receiving/transmitting faces disposed in planes that form a right triangle. The light receiving/transmitting faces are opposite to each other and are disposed between an optically clear substrate.

In an embodiment, when a ray of light is incident on the outermost surface of the LCD screen cover, the incident ray of light is reflected away from an observer when the observer is perpendicular to the LCD screen. Furthermore, when light emanates from the native LCD screen, the light rays are received by the innermost surface and then the light will transverse through the LCD screen cover and appear to an observer. The light reflecting and the light that transverses through the LCD screen cover occur simultaneously and as a result, the observer detects the same image of the native LCD screen and not the incident glare.

In an embodiment, a shield is for substantially eliminating glare from an electronic flat display screen: an electronic flat display screen having a viewable surface extending between a display screen top and a display screen bottom; the display screen covered by an aftermarket screen shield for preventing screen glare otherwise visible to the display screen user; the shield having the form of a wedge and covering the viewable surface; and, a shield thickness normal to the viewable surface having a value of t1 near the display screen bottom and a value of t3 near the display screen top wherein t3>t1; wherein an angle between opposed sides of the shield is not less than 7 degrees and not more than 16 degrees.

In an embodiment, a digital camera comprises: a digital single lens reflex camera body having a lens side opposite an LCD screen side, the sides extending between a body top and a body bottom; the LCD screen side including an LCD screen with a substantially constant thickness normal to a lens central axis; the LCD screen including a viewable surface for presenting a camera user with images acquired by a camera lens; an aftermarket LCD screen shield for preventing LCD screen glare otherwise visible to the camera user; the shield having the form of a wedge and covering the LCD screen viewable surface; and, a shield thickness normal to the lens central axis having a value of t1 near the body bottom and a value of t3 near the body top wherein t3>t1; wherein an angle between 7 and 16 degrees separates a free surface of the shield and the LCD screen viewable surface.

And, in an embodiment, an improved digital camera comprises: a digital single lens reflex camera body having a lens side opposite an LCD screen side, the sides extending between a body top and a body bottom; the LCD screen side including an LCD screen having the form of a wedge; the LCD screen having a first and second adjoining layers; the first screen layer including a liquid crystal layer and having a substantially constant thickness normal to a camera lens central axis; the second screen layer including a polarizing layer and having a variable thickness normal to a camera lens central axis; and the second screen layer having a viewable free surface oriented at an angle of (θ+90) degrees with respect to the camera lens central axis; wherein (i) an LCD screen thickness normal to the lens central axis has a value of t1 near the body bottom and a value of t3 near the body top, (ii) t3>t1, and (iii) θ is an angle between 7 and 16 degrees.

BRIEF DESCRIPTION OF THE DRAWINGS

The present invention is described with reference to the accompanying figures. These figures, incorporated herein and forming part of the specification, illustrate some embodiments of the invention and, together with the description, further serve to explain its principles enabling a person skilled in the relevant art to make and use the invention.

DETAILED DESCRIPTION OF PREFERRED EMBODIMENTS

The disclosure provided in the following pages describes examples of some embodiments of the invention. The designs, figures and description are non-limiting examples of the embodiments they disclose. For example, other embodiments of the disclosed device and/or method may or may not include the features described herein. Moreover, disclosed advantages and benefits may apply to only certain embodiments of the invention and should not be used to limit the disclosed invention.

As used herein, the terms "coupled" and "attached" include direct and indirect connections. Moreover, where first and second devices are coupled or attached, intervening devices including active devices may be located therebetween.

Figure 1:
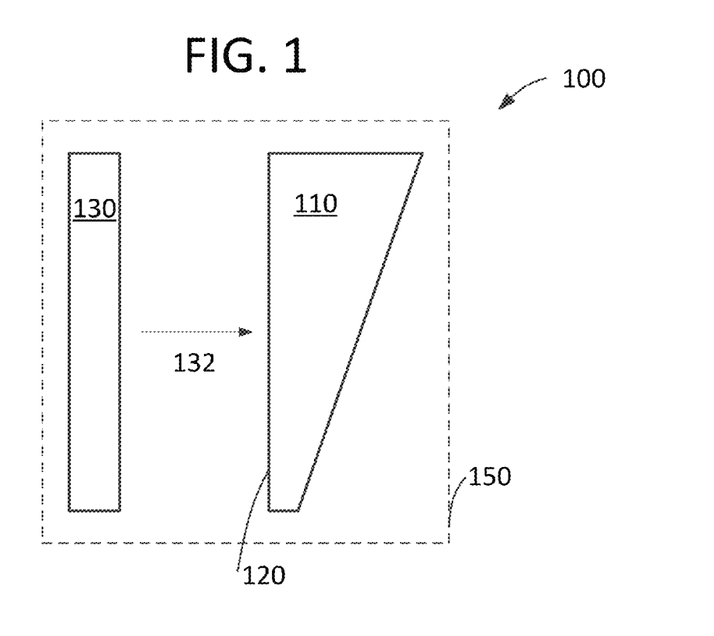
FIG. 1 shows a light source viewable through a transparent cover of variable thickness of the present invention.

FIG. 1 shows a light source viewable through a transparent cover or shield of variable thickness 100. In particular, a covered display 150 includes a light source 130 for emitting light 132. The emitted light is incident on a rear surface 120 of the transparent cover 110. Light sources mentioned herein include electronic light sources and in particular flat panel type light sources such as liquid crystal display ("LCD") light sources.

Embodiments of the transparent screen covers mentioned herein may be made from or comprise various optically clear materials that are cast, cell-cast, molded, extruded, sprayed, floated, machined, or otherwise formed. Suitable materials include various glass, glass-like, and polymeric materials. For example, optically clear silica glasses such as selected borosilicate glasses and optically transparent plastics such as selected acrylate plastics may be used. In an embodiment, optically clear polymethylmethacrylate ("PMMA") is chosen for its superior combination of characteristics including light transmission, durability, and density/weight. An AR (anti-reflective) coating may be applied on the light receiving surface 120 to improve light transmission.

Figure 2:
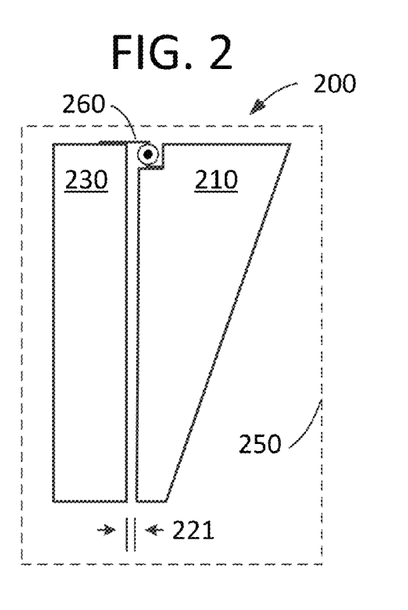
FIG. 2 shows a first covered display with a light source and the transparent cover similar to that of FIG. 1.

The light source and the transparent cover may be separable as with a movable or removable cover. For example, the embodiment 200 of FIG. 2 shows a covered display 250 with a light source 230 and a transparent cover 210. Here, the cover is articulated and/or removable with respect to the light source as with a cover that is hinged 260 to the light source or its housing. To the extent it exists, an air gap 221 between the transparent cover 210 and the light source 230 may be in the range of 0.5 mm to 1.5 mm.

Figure 3:
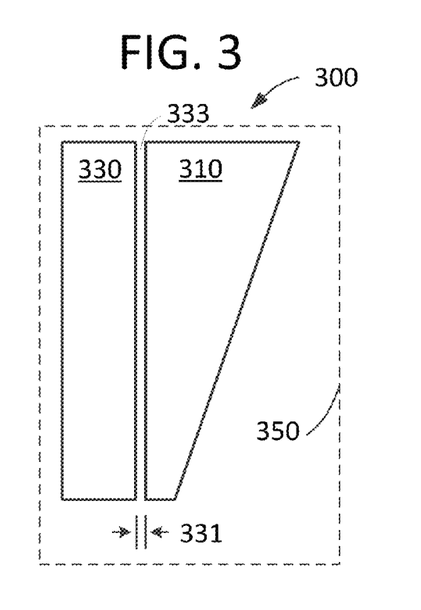
FIG. 3 shows a second covered display with a light source and a transparent cover similar to that of FIG. 1.

The light source and the transparent cover may be immovably fixed and/or attached together. For example, the embodiment 300 of FIG. 3 shows a covered display 350 with a light source 330 and a transparent cover 310. Here, the optical grade adhesive may be used to join the light source to the transparent cover such that light passing through the adhesive is incident on cover rear surface 120. Thicknesses 331 of the optical adhesive 333 between the light source 330 and the transparent cover 310 may be in the range of 0.5 mm to 1.5 mm. Notably, in some embodiments contact adhesion between the light source and the transparent eliminates the need for use of an optical grade adhesive. Particular attachment means may be chosen to compensate for minor coupling losses such as losses due to the presence of air.

Figure 4:
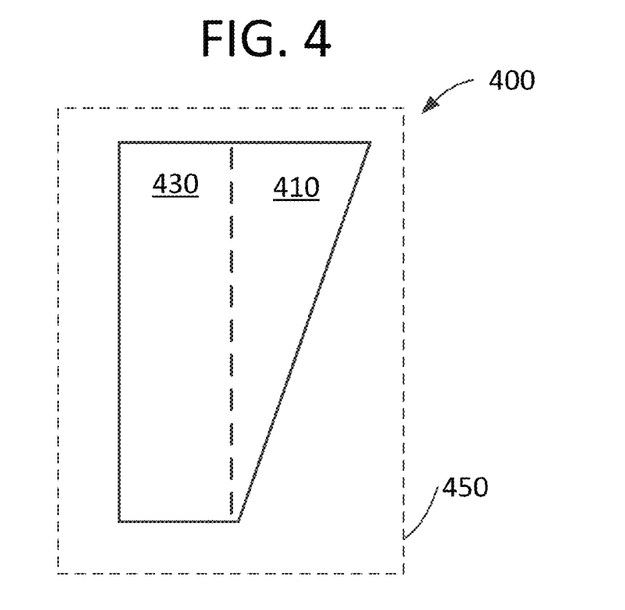
FIG. 4 shows a third covered display wherein a light source is integral with a transparent cover similar to that of FIG. 1.

The light source and the transparent cover may be integral. For example, the embodiment 400 of FIG. 4 shows a covered display 450 wherein a light source, or portion of a light source, 430 is integral with a transparent cover 410. Examples of this integral structure include structures wherein mating portions of the light source and cover are cast, molded, extruded, or otherwise formed as a single part.

Figure 5:
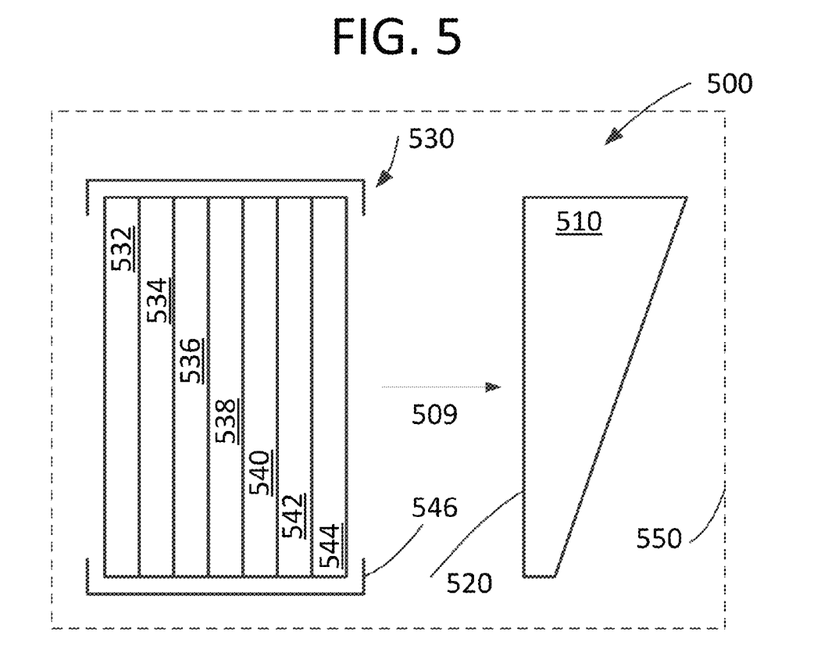
FIG. 5 shows a covered display with a selected liquid crystal display light source and a transparent cover similar to that of FIG. 1.

FIG. 5 shows a covered display with a selected liquid crystal display light source 500. In particular, an optical block 550 includes an LCD light source 530 for emitting light 509 toward a transparent cover 510. The emitted light is incident on the transparent cover rear surface 520.

As shown, the LCD 530 includes multiple layers, for example seven layers: a backlight layer 532, two polarizing layers 534, 542, a somewhat central layer 538 between front and rear glass plates 540, 536, and a front plate layer 544.

The somewhat central layer 538 includes a liquid crystal ("LC") layer for controlling the transmission of light that originates from the backlight layer 532. To either side of the central/LC layer 538 are the glass plates 536 (rear), 540 (front) and to either side of the glass plates are the polarizing filters 534 (e.g., rear vertical polarizing filter), 542 (e.g., front horizontal polarizing filter). In the example shown, light emitted 509 from the LCD 530 passes through a front plate 544 such as a front glass plate. One or more of the LCD layers may be set in or held by a bracket, cage, housing, or similar structure 546.

In various embodiments, the transparent cover 520 may be (i) separated from the front plate 544 by an air gap of 1 mm or less, (ii) bonded to the front plate 544 via contact or adhesive bonding, (iii) hinged to an LCD housing 546, or integral with one or more of the front plate 546, polarizing filter 542, and front glass plate 540.

Figure 6:
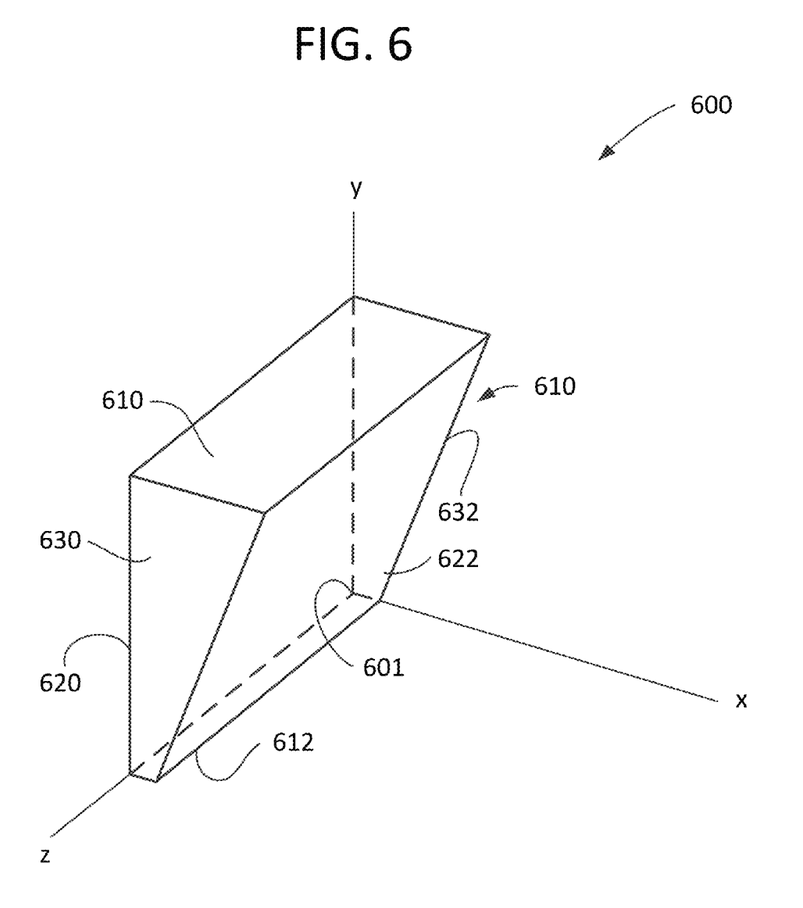
FIG. 6 shows a perspective view of a transparent cover similar to the transparent cover of FIG. 1.

FIG. 6 shows a perspective view of a selected transparent cover 600. In this view, a wedge shaped transparent cover 610 is oriented with the axes x, y, z of an orthogonal coordinate system such that the coordinate system origin is coincident with a cover corner 601.

As seen, the cover has a variable thickness and presents six somewhat planar or planar faces. In the x-z plane are to top 610 and bottom 612 faces. In the x-y plane are the left side 630 and right side 632 faces. In the y-z plane is the rear face 620 on which light from a light source is incident. Opposite the rear face 620 is a front face 622 that is sloped such that the area of the top face 610 is larger than the area of the bottom face 612.

Figure 7:
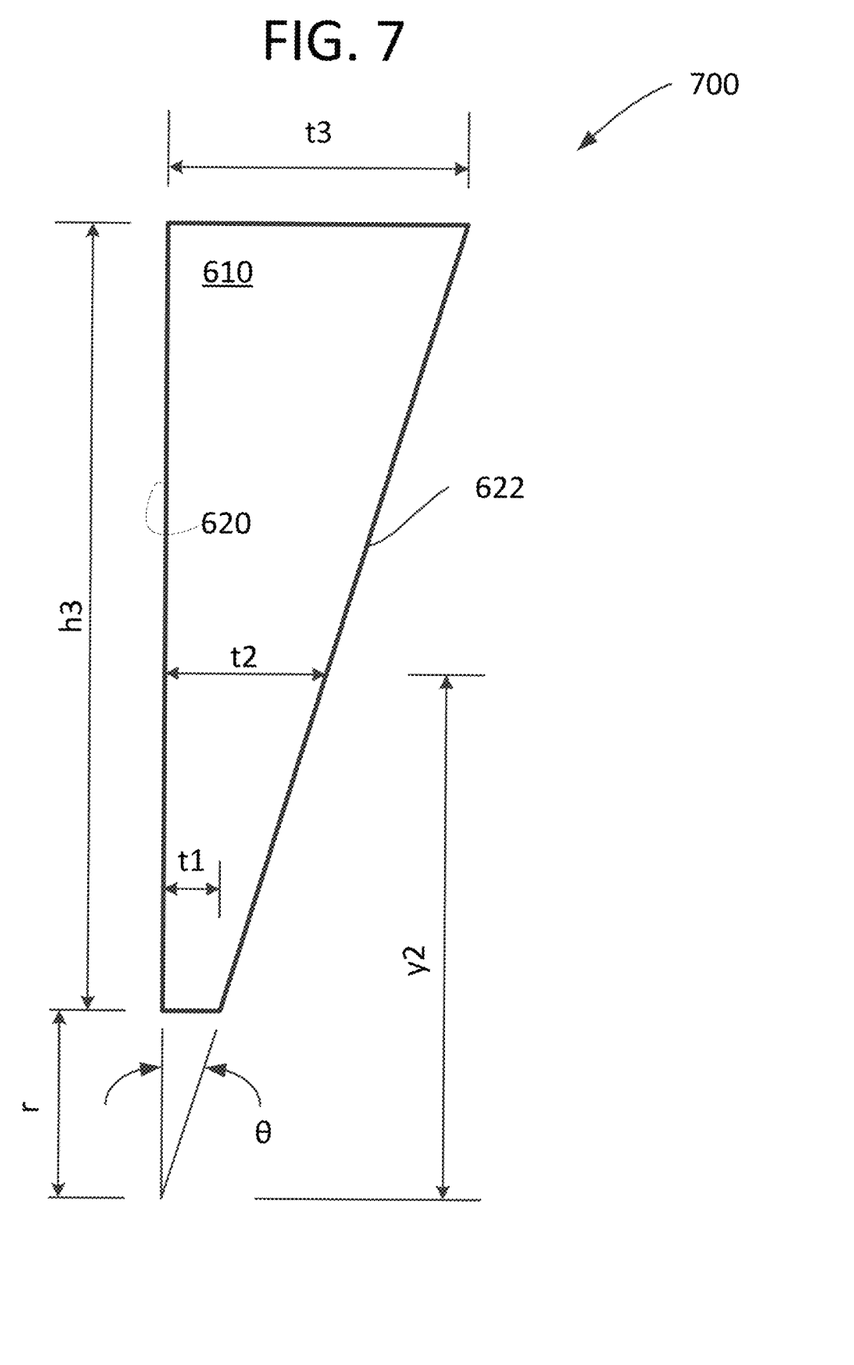
FIG. 7 shows a view of the left side face of the transparent cover of FIG. 6.

FIG. 7 shows a view 700 of the left side face of the transparent cover of FIG. 6. As shown, this face has a height "h3," a top thickness "t3," and a bottom thickness "t1" such that (t1<t3). Further, an angle $\theta$ is formed between the front 622 and rear 620 faces.

For embodiments of the transparent cover with a front face 622 of constant slope (as shown), an angle $\theta$ is formed between the front 622 and rear 620 faces such that $\tan(\theta) = (t3/(r+h3))$. Further, an arbitrary cover thickness t2 may be calculated as $t2 = y2*\tan(\theta)$ where $r \leq y2 \leq (r+h3)$.

Figure 8:
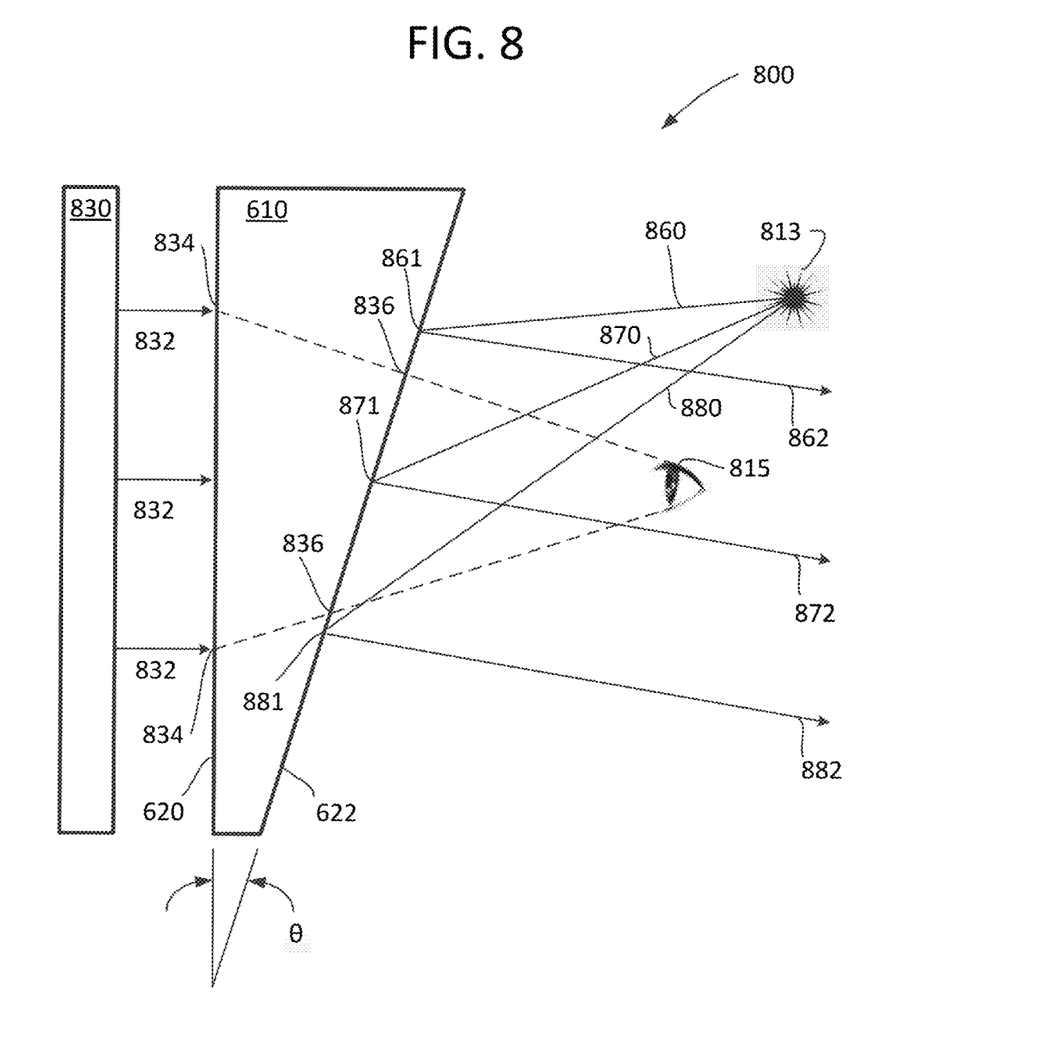
FIG. 8 shows a use of the transparent cover of FIG. 6.

FIG. 8 shows a use 800 of the transparent cover of FIG. 6. Here, a light receiving rear surface 620 of the transparent cover 610 is disposed directly opposite an LCD display screen 830 such that light emitted 832 from the LCD display screen impinges on the cover's rear light receiving face 620. Notably, any of the light source and transparent cover arrangements discussed above might be used.

When the LCD light source 830 is activated, light is emitted toward the cover rear light receiving surface 620. The emitted light may form, inter alia, static or moving images such as snapshot or motion picture images.

Light from the LCD light source 832 impinges 834 on the transparent cover 610 light receiving surface 620, travels through the cover, and exits 836 the cover at its front surface 622. Notably, an observer 815 looking at the LCD light source 830 will see the LCD image as it is presented on the cover light receiving surface 620.

As an observer 815 is viewing LCD 830 images, the cover 610 materials and geometry operate to reduce or substantially eliminate glare. In particular, where a stray source of ambient light 813 (e.g., the sun) is directed 860, 870, 880 at the cover's viewable front surface 622, this sloped surface described by the angle θ operates to reflect these rays 861-862, 871-872, 881-882 away from the observer 815.

In a first embodiment, angle θ varies between 7-16 degrees. In a second and more preferred embodiment, angle θ varies between 10 and 13 degrees. In a yet more preferred embodiment, angle θ is about 12 degrees. Notably, other light redirection angles may be contemplated with due consideration given to the application and the resulting transparent cover thicknesses and properties such as any undesirable magnification due to increased cover thickness.

Figures 9A, 9B:
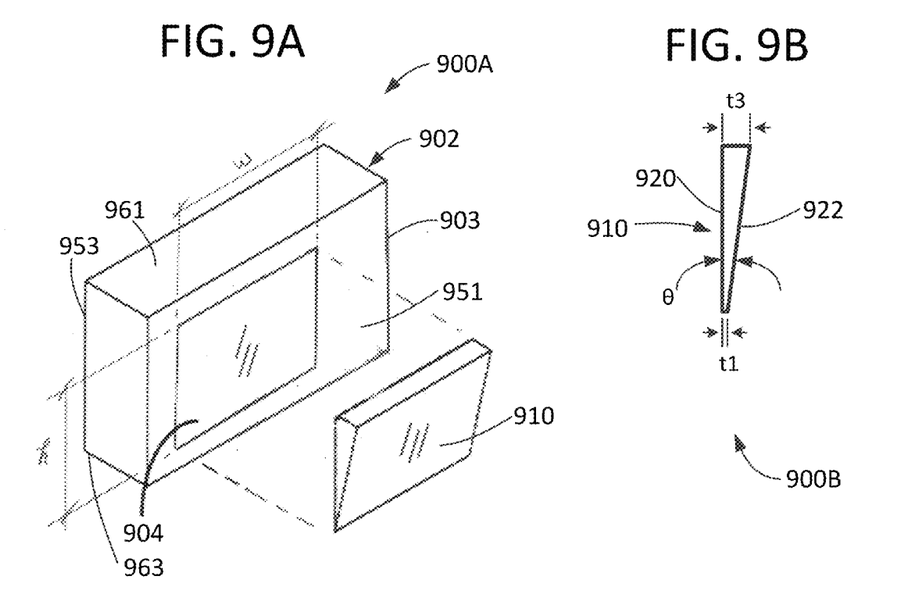
FIGS. 9A-B show a digital camera and an LCD screen cover similar to the transparent cover of FIG. 1.

FIGS. 9A-B show a digital camera and an LCD screen cover 900A-B. The digital camera 902 has an LCD screen 904. In various embodiments, a camera body 903 has opposed sides including a lens side 953 opposite an LCD screen side 951, the sides extending between a body top 961 and a body bottom 963. Among other things, the LCD screen may function in one or more of a camera viewfinder system, a camera picture review system, and a camera messaging system.

An LCD screen cover 910 is shown ready for mounting directly to the camera 902, for example for mounting directly to the LCD screen 904 via an optical grade adhesive, by contact adhesion, or by another suitable means known to skilled artisans.

The table below provides dimensions for an exemplary embodiment of the screen cover 910.

| Variable | Value |
| --- | --- |
| h | 1.84 inches |
| w | 2.4 inches |
| θ | 12 degrees |
| t1 | 0.005 inches |
| t3 | 0.396 inches |

Here, the height "h" of the LCD screen 904 is approximately 1.84 inches and the width "w" of the LCD screen is approximately 2.4 inches. Setting θ, the angle between opposing cover sides 920, 922, to approximately 12 degrees results in a top thickness t3 of approximately 0.396 inches where a minimum or bottom thickness t1 is approximately 0.005 inches.

Figure 9C:
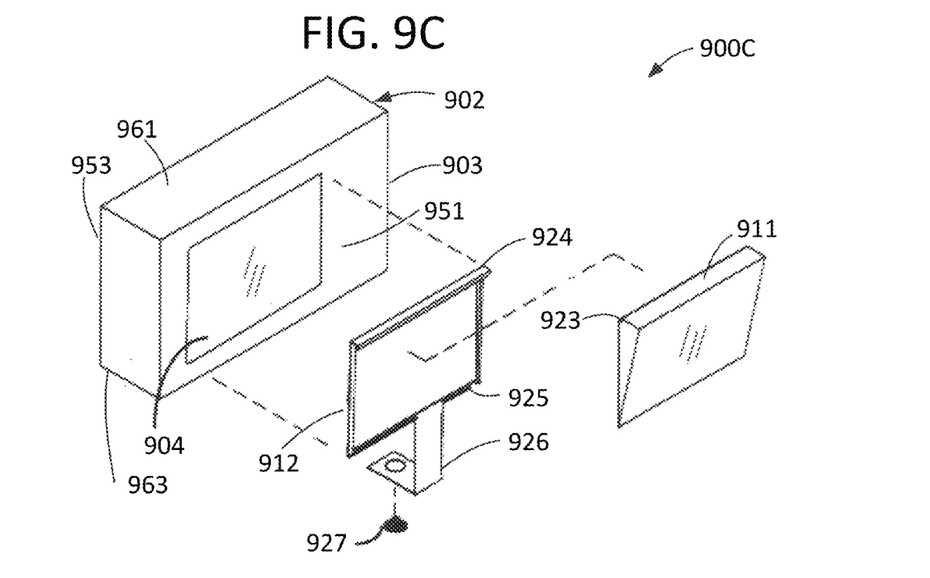
FIG. 9C shows a digital camera and an LCD screen cover holder for holding a transparent cover similar to the transparent cover of FIG. 1.

FIG. 9C shows a digital camera 902 and an LCD screen cover holder 900C. The digital camera 902 has an LCD screen 904. In various embodiments, a camera body 903 camera has opposed sides including a lens side 953 opposite an LCD screen side 951 extending between a body top 961 and a body bottom 963. Among other things, the LCD screen may function in one or more of a camera viewfinder system, a camera picture review system, and a camera messaging system.

A screen cover housing 912 that is adapted to hold a screen cover 911 is for attachment to the camera. A step or notch 923 may be provided along an upper widthwise edge of the LCD screen cover 911 to provide a mounting receptacle for the LCD screen cover housing 912.

As shown, the LCD screen cover housing 912 encloses and/or holds the LCD screen cover 911. The housing includes respective upper and lower lips 924, 925 for retaining the LCD screen cover. In an embodiment, the housing 912 is formed from stainless steel (e.g., 302 stainless) with a black finish to limit reflective glare from the housing. It is contemplated that other materials, for example polymers or plastics such as nylon, ABS, and polystyrene, may be utilized to form the LCD screen cover housing.

In various embodiments, the housing 912 includes an arm 926 and a fastener 927 for interconnection with the digital camera 902. The fastener provided may incorporate a standard thread and pitch that is compatible with popular digital cameras such as any of Nikon (e.g., Nikon D810) or Canon (e.g., Canon EOS 5D) digital single lens reflex (DLSR) cameras. Moreover, other types of attachments suitable to the application may be employed as needed.

While various embodiments of the present invention have been described above, it should be understood that they have been presented by way of example only, and not limitation. It will be understood by those skilled in the art that various changes in form and details can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A shield for substantially eliminating glare from an electronic flat display screen comprising:
    an electronic flat display screen having a viewable surface extending between a display screen top and a display screen bottom;
    the display screen covered by an aftermarket screen shield for preventing screen glare otherwise visible to the display screen user;
    the shield having the form of a wedge and covering the viewable surface; and,
    a shield thickness normal to the viewable surface having a value of t1 near the display screen bottom and a value of t3 near the display screen top wherein t3>t1;
    wherein an angle between opposed sides of the shield is not less than 7 degrees and not more than 16 degrees.

2. The shield of claim 1 wherein the angle between opposed sides of the shield is about 12 degrees.

3. The shield of claim 2 wherein the shield is made from polymethylmethacrylate.

4. The shield of claim 3 wherein the shield is affixed to the display screen with an optical bonding adhesive.

5. An improved digital camera comprising:
    a digital single lens reflex camera body having a lens side opposite an LCD screen side, the sides extending between a body top and a body bottom;
    the LCD screen side including an LCD screen with a substantially constant thickness normal to a lens central axis;

the LCD screen including a viewable surface for presenting a camera user with images acquired by a camera lens;

an aftermarket LCD screen shield for preventing LCD screen glare otherwise visible to the camera user;

the shield having the form of a wedge and covering the LCD screen viewable surface; and, a shield thickness normal to the lens central axis having a value of t1 near the body bottom and a value of t3 near the body top wherein t3>t1;

wherein an angle between 7 and 16 degrees separates a free surface of the shield and the LCD screen viewable surface.

6. The camera of claim 5 wherein the angle separating a free surface of the shield and the LCD screen viewable surface is about 12 degrees.

7. The camera of claim 6 wherein the shield is made from polymethylmethacrylate.

8. An improved digital camera comprising:

a digital single lens reflex camera body having a lens side opposite an LCD screen side, the sides extending between a body top and a body bottom;

the LCD screen side including an LCD screen having the form of a wedge;

the LCD screen having a first and second adjoining layers;

the first screen layer including a liquid crystal layer and having a substantially constant thickness normal to a camera lens central axis;

the second screen layer including a polarizing layer and having a variable thickness normal to a camera lens central axis; and the second screen layer having a viewable free surface oriented at an angle of ($\theta$+90) degrees with respect to the camera lens central axis;

wherein (i) an LCD screen thickness normal to the lens central axis has a value of t1 near the body bottom and a value of t3 near the body top, (ii) t3>t1, and (iii) $\theta$ is an angle between 7 and 16 degrees.

9. The camera of claim 8 wherein the angle $\theta$ is about 12 degrees.

10. The camera of claim 9 wherein the second screen layer is made from substantially of polymethylmethacrylate.

* * * * *